(12) United States Patent
Kundu et al.

(10) Patent No.: US 9,131,107 B2
(45) Date of Patent: Sep. 8, 2015

(54) TELEPRESENCE DEVICE COMMUNICATION AND CONTROL SYSTEM

(71) Applicants: Rithik Kundu, Lexington, MA (US); Malay Kundu, Lexington, MA (US)

(72) Inventors: Rithik Kundu, Lexington, MA (US); Malay Kundu, Lexington, MA (US)

( * ) Notice: Subject to any disclaimer, the term of this patent is extended or adjusted under 35 U.S.C. 154(b) by 79 days.

(21) Appl. No.: 14/133,627

(22) Filed: Dec. 18, 2013

(65) Prior Publication Data

US 2014/0168351 A1    Jun. 19, 2014

Related U.S. Application Data

(60) Provisional application No. 61/738,762, filed on Dec. 18, 2012.

(51) Int. Cl.
*H04N 7/14* (2006.01)

(52) U.S. Cl.
CPC .................................... *H04N 7/147* (2013.01)

(58) Field of Classification Search
USPC .............. 348/14.01, 14.02, 14.04, 14.05
See application file for complete search history.

(56) References Cited

U.S. PATENT DOCUMENTS

| 6,850,817 | B1* | 2/2005 | Green .......................... 700/245 |
| 8,179,418 | B2* | 5/2012 | Wright et al. .............. 348/14.05 |
| 8,306,664 | B1  | 11/2012 | Wiley et al. |
| 2004/0088078 | A1* | 5/2004 | Jouppi et al. .................. 700/245 |
| 2005/0267826 | A1* | 12/2005 | Levy et al. ....................... 705/34 |
| 2011/0213210 | A1* | 9/2011 | Temby et al. ................. 600/300 |
| 2011/0292193 | A1* | 12/2011 | Wang et al. ..................... 348/61 |
| 2012/0281092 | A1* | 11/2012 | Olivier et al. ................. 348/148 |
| 2013/0113871 | A1* | 5/2013 | Ballantyne et al. ........ 348/14.05 |
| 2014/0015914 | A1* | 1/2014 | Delaunay ................... 348/14.02 |
| 2014/0139616 | A1* | 5/2014 | Pinter et al. ................ 348/14.08 |

* cited by examiner

*Primary Examiner* — Olisa Anwah
(74) *Attorney, Agent, or Firm* — Beacon Patent Intelligence LLC; Eugene H. Nahm

(57) ABSTRACT

A telepresence unit control and communication methods are disclosed. The telepresence unit enables a virtual presence of a controller, a human being, located away from the telepresence unit. The telepresence unit control and communication methods enable a mechanical motion control of the telepresence unit by utilizing a visual communication between the telepresence unit and a computer administered by the controller. The telepresence unit utilizes a mobile computing device to establish the visual communication channel to the computer via the internet. Once the visual communication channel is established, the present invention provides a video modification as means of controlling and communicating with the telepresence unit.

20 Claims, 5 Drawing Sheets

TELEPRESENCE DEVICE COMMUNICATION AND CONTROL SYSTEM

CROSS-REFERENCE TO RELATED APPLICATIONS

This application is a non-provisional application which claims the benefit to Provisional Application No. 61/738,762 filed on Dec. 18, 2012.

BACKGROUND OF THE INVENTION

1. Field of the Invention

The present invention relates in general to a telepresence unit. More particularly, a system and method for communication and control of a telepresence unit.

2. Description of Related Art

Telepresence unit is designed to provide means for communicating with a person in a remote location. Telepresence unit can provide not only an efficient channel of communication among people in different locations, but also provide a tool to enable a mechanical control of a physical device or machine.

While there exits many telepresence units, not many of them provides an easy set-up and configuration to enable such a communication tool. Most of the existing telepresence systems require specialized user interfaces to control and communicate the telepresence units located remotely. At times, such complexity in set-up and configuration of the user interfaces hinders a general public from utilizing such a technology.

Therefore, a need exists for a device, system, and method of communication and control of a telepresence technology that utilizes readily available communication and control interfaces by the general public.

SUMMARY OF THE INVENTION

The subject matter of this application may involve, in some cases, interrelated products, alternative solutions to a particular problem, and/or a plurality of different uses of a single system or article.

In one aspect, a telepresence unit is provided. The telepresence unit comprises a base supported on driving means, a mobile computing device established with a communication channel via an internet, where the mobile computing device is located on the base, a drive mechanism which provides a plurality of mechanical motions to the driving means, a visual sensor to obtain a video modification generated from the mobile computing device, and a control processor communicating with the drive mechanism and the visual sensor, where the control processor receives the video modification and outputs a signal to maneuver the drive mechanism. The control processor comprises a power unit.

In another aspect, a telepresence system is provided. A telepresence system generally comprises a telepresence unit remotely maneuvered by a controller where the telepresence unit comprises a visual sensor and a mobile computing device. The visual sensor analyzes a video modification displayed on the mobile computing device communicated by the controller. The telepresence system further comprises a computer communicating with the mobile computing device where the controller may remotely maneuver the telepresence unit by transmitting the video modification to the mobile computing device using the computer. The video modification may be assigned a signal to maneuver the telepresence unit. The telepresence system further comprises a plurality of drive mechanisms which provides a plurality of mechanical motions to the telepresence unit in response to the video modification.

In yet another aspect, a method of remotely controlling a telepresence unit which comprises a mobile computing device is provided. A controller at a remote location first establishes a visual communication channel with the mobile computing device. An original video generated from the telepresence unit is received and the original video is modified to include a video modification. Once modified, the modified original video is transmitted to the mobile computing device and the telepresence unit is configured to perform an action upon receiving the video modification.

In a further aspect, a method of processing a video modification to control a telepresence unit having a visual sensor is provided. The visual sensor receives the video modification displayed on the telepresence unit. The received video modification is analyzed by a control processor, and the analyzed video modification is then transmitted to a drive mechanism which maneuvers the telepresence unit.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
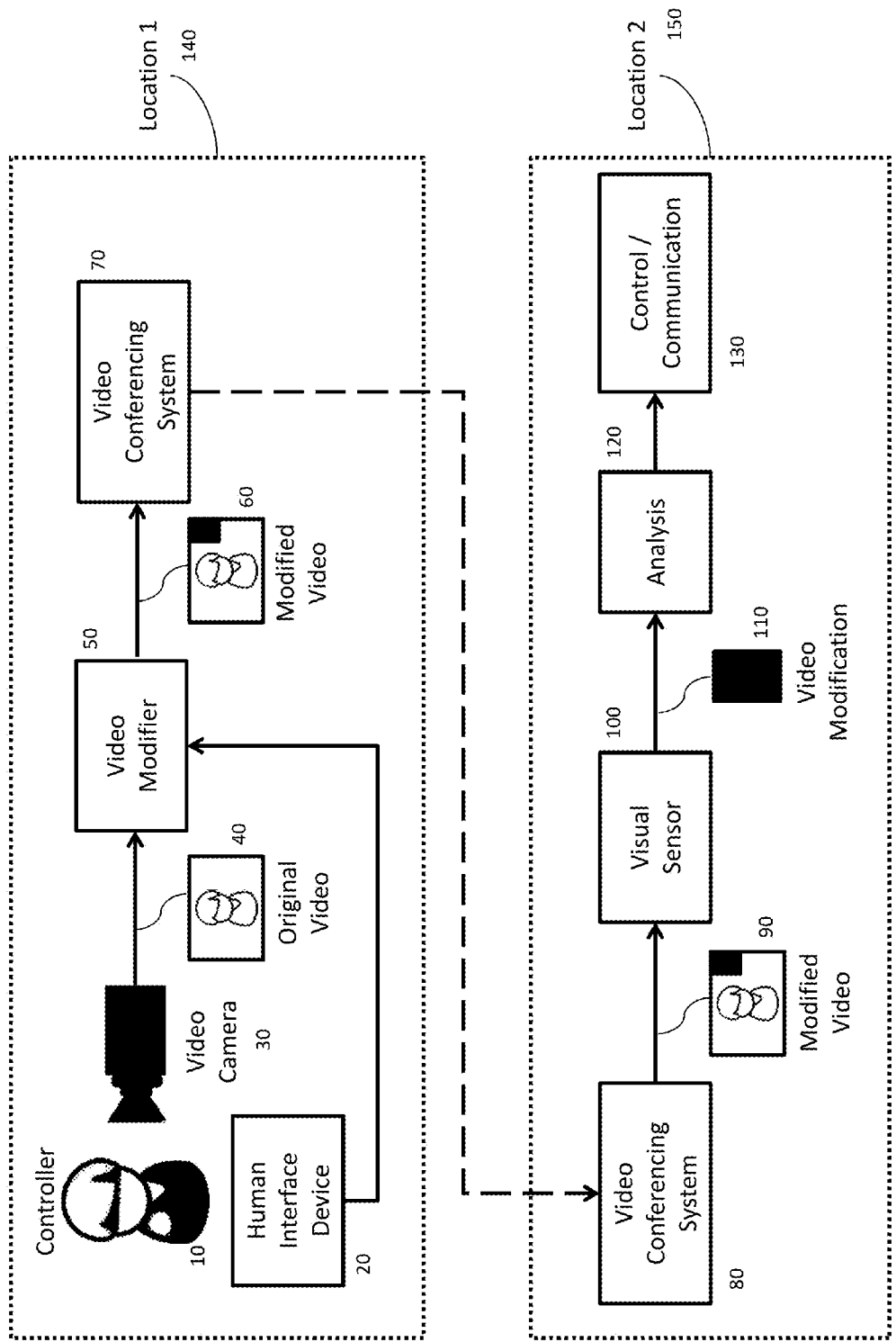
FIG. 1 provides a flow diagram illustrating a communication between a controller and a telepresence unit.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Telepresence units are commonly controlled via a specialized control system such as a wired connection or Bluetooth pairing. Currently, a mobile computing device, such as a tablet, is a popular computing device among the general public. The present disclosure contemplates a method of remotely controlling a telepresence unit through modification of a video generated through a visual communication channel between a computer controlled by a controller, an end user remotely located away from the telepresence unit, and the mobile computing device configured to communicate with the telepresence unit. Such visual communication channel may be established via a common teleconferencing system. Modifying a video in conjunction with a video conferencing system operated on the mobile computing device can provide seamless control of the telepresence unit without any specialized control system configured to the telepresence unit.

A video modification of a video generated through the visual communication channel may be achieved via a video modifier program that enables a graphical edits and manipulation to the video. In one embodiment, the video modification may be an addition of a color block wherein the color block is assigned with a color that translates into mechanical control of the telepresence unit. For instance, green color assigned to the color block may command the telepresence unit to move forward, and so on. Similarly, a higher level command such as "go back to base" may be performed by a video modification of a more complex static image or a dynamic series of images. In another embodiment, the color block modified into the video may be sensed by a visual sensor. The visual sensor may sense the color displayed on the mobile computing device, then a signal maybe generated by a control processor which commands a drive mechanism to generate a mechanical motion to the telepresence unit. The control processor comprises a power unit wherein the power unit provides power to the drive mechanism.

The video modification contemplated herein may be various types of graphical modifications, which may include, but are not limited to, modification applied in ways of light intensity, two or three dimensional body gestures, two or three dimensional facial gestures, textures, patterns, watermarks, texts, and the like.

The video modification also may be in form of audio or speech modifications communicated via the video conference connection.

The telepresence unit contemplated herein may be a motorized mechanical unit, which includes but is not limited to, a toy car, a stunt airplane, or other robotic devices, and the like.

The mobile computing device or the computer contemplated herein may include, but are not limited to, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Driving means contemplated herein may include, but are not limited to, various types of wheels, propellers, and the like.

A matrix barcode contemplated herein may be a machine readable representation of data which may include, but are not limited to a barcode, a QR code, and the like.

Turning now to FIG. 1, a flow diagram illustrating a communication between a controller and a telepresence unit is shown. The controller 10, a person, may be located in a location 1 140. In one embodiment, the controller 10 may control a computer via a human interface device 20. The human interface device 20 may include, but not limited to, a mouse, a touch screen, and the like. In another embodiment, the controller may be a device such that a non-human controller can control the computer without the need of a human interface device.

The controller 10 may modify an original video 40 generated by a video camera 30 using the computer. The computer may provide a video modifier 50 which enables modification of the video. In one embodiment, the controller may modify the original video to include a color block displaying a color into the original video. The color block may be placed at a predetermined location of the original video, generating the modified video that includes the color block. In another embodiment, the controller may modify the original video to include a matrix barcode to be displayed on the modified video.

The original video may be generated by the controller wherein the original video may be from a various types of video source. The video source need not be a video of the controller, but may be any pictures which may include, but are not limited to, motion pictures, still images, recorded videos, and the like.

The computer may establish a visual communication channel with the telepresence unit. In one embodiment, the visual communication channel is established via a video conferencing system 70. Once the video is modified, a modified video 60 may be inputted through the video conferencing system 70.

The telepresence unit may be located at location 2 150. In order to remotely control and communicate with the telepresence unit, the controller 10 may send the modified video 90 through the video conferencing system 80 established between the computer and the telepresence unit. In one embodiment, the telepresence unit may comprise a mobile computing device which may be configured to communicate with the computer via an internet.

The modified video 90 may be displayed on the mobile computing device. A visual sensor 100 may sense and analyze a modification made in the modified video 90. In one embodiment, the visual sensor may recognize a video modification 110 and isolate the video modification. The video modification 110 comprises the color block and the matrix barcode. In another embodiment, the video modification 110 is analyzed 120 by a control processor located on the telepresence unit. The analysis 120 generates a signal to control the telepresence unit located at location 2. The signal may conduct the telepresence unit control and communication function 130.

Figure 2:
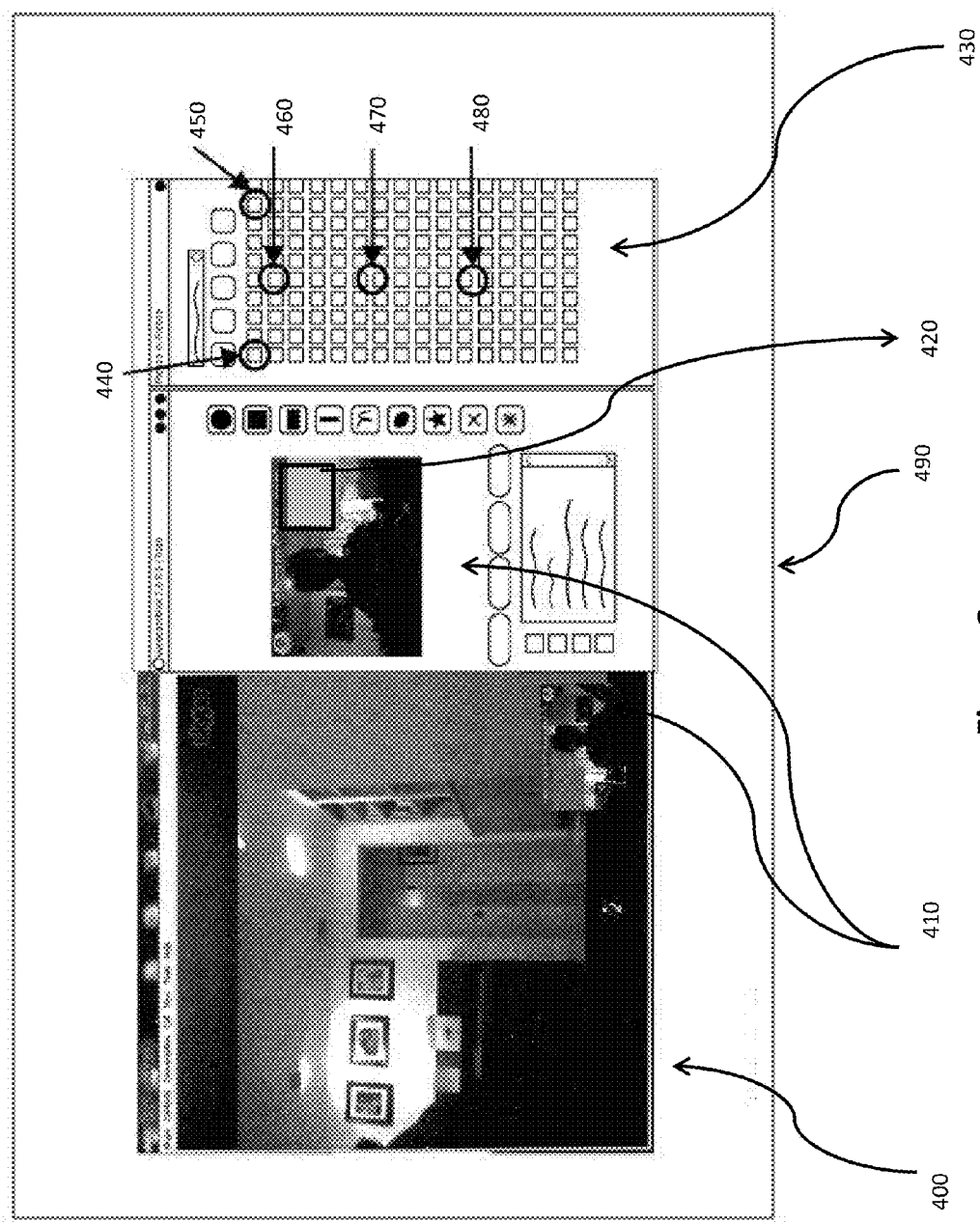
FIG. 2 provides an embodiment of a human interface and a video modification control.

FIG. 2 provides an embodiment of the human interface to remotely control the telepresence unit. In one embodiment, the human interface 490 may be designed to modify the original video to include the color block, controlled by the controller. The original video 400 is shown. The modified video 410 shows the color block 420. Array of colors 430 that may be assigned to the color block 420 are displayed. For instance, color 440 may be green which commands the telepresence unit to move forward. Selection of colors 450, 460, 470, 480 may be assigned a different mechanical motion that may be translated to the telepresence unit.

Figure 3:
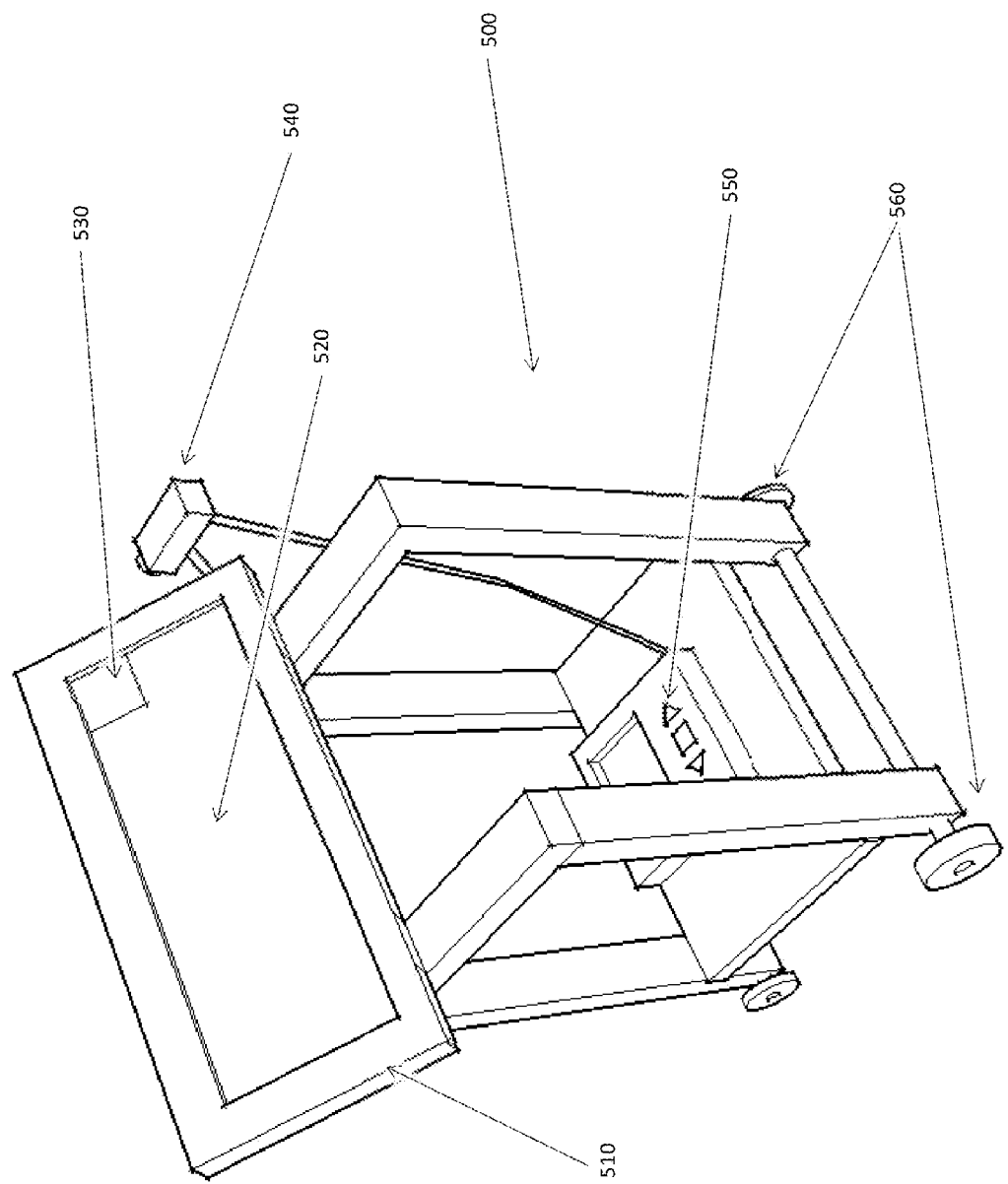
FIG. 3 provides an embodiment describing a telepresence unit.

FIG. 3 illustrates am embodiment of a telepresence unit 500. In one embodiment, the telepresence unit may comprise driving means 560 mounted at a base of the telepresence unit. A mobile computing device 510 may be placed communicating with a computer via an internet. The computer may be controller by a controller located remotely from the telepresence unit. In another embodiment, a drive mechanism may provide a plurality of mechanical motion to the driving means 560. A control processor 550 may be configured to communicate with the drive mechanism which delivers mechanical motions to the driving means 560. The control processor 550 comprises a power unit wherein the power unit provides power to the drive mechanism.

In yet another embodiment, a visual sensor 540 is placed facing a video modification 530. The video modification 530 may be located at a predetermined location of a display 520 of a mobile computing device 510. In a further embodiment, a control processor 550 is placed communicating with the drive mechanism and the visual sensor wherein the control processor receives the video modification and outputs a signal to maneuver the drive mechanism. In yet another embodiment, the drive mechanism may control mechanical motion of the mobile computing device 510 which enables tilt, swivel, and the like motion of the mobile computing device 510.

Figure 4:
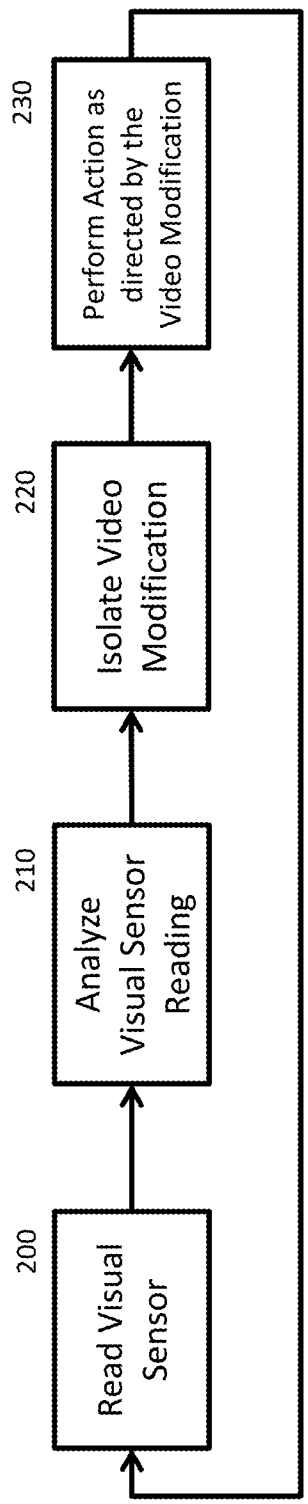
FIG. 4 provides a flow diagram illustrating a method of processing a video modification to remotely control a telepresence unit.

FIG. 4 provides a flow diagram illustrating a method of processing a video modification to remotely control a telepresence unit. Specifically, FIG. 4 contemplates a process from the modified video being read by the visual sensor to the video modification being translated into performing a mechanical action to the telepresence unit.

In step 200, the visual sensor is read. Next in step 210, a reading of the visual sensor is analyzed. In on embodiment, the reading may recognize a color which may involve comparing colors. For example, red, green, and blue intensity readings may be analyzed.

Once the visual sensor reading is analyzed by the control processor. The video modification may be isolated 220. In one embodiment, the video modification may be a color block. In another embodiment, the video modification may be a matrix barcode.

Next, once the video modification is isolated 220, the control processor generates a signal to the drive mechanism for the telepresence to perform actions as directed by the video modification 230. The Actions may include mechanical motions or virtual motions. Mechanical motions may include moving, turning in a particular direction, controlling a robotic arm, making a sound, activating a light, and the like. Virtual motions may include writing values to variables, saving data to files, communicating data to other systems, recording data from particular sensors, and the like. Both the mechanical and the virtual motions are generated via the control processor which communicates both with the visual sensor and the drive mechanism.

Figure 5:
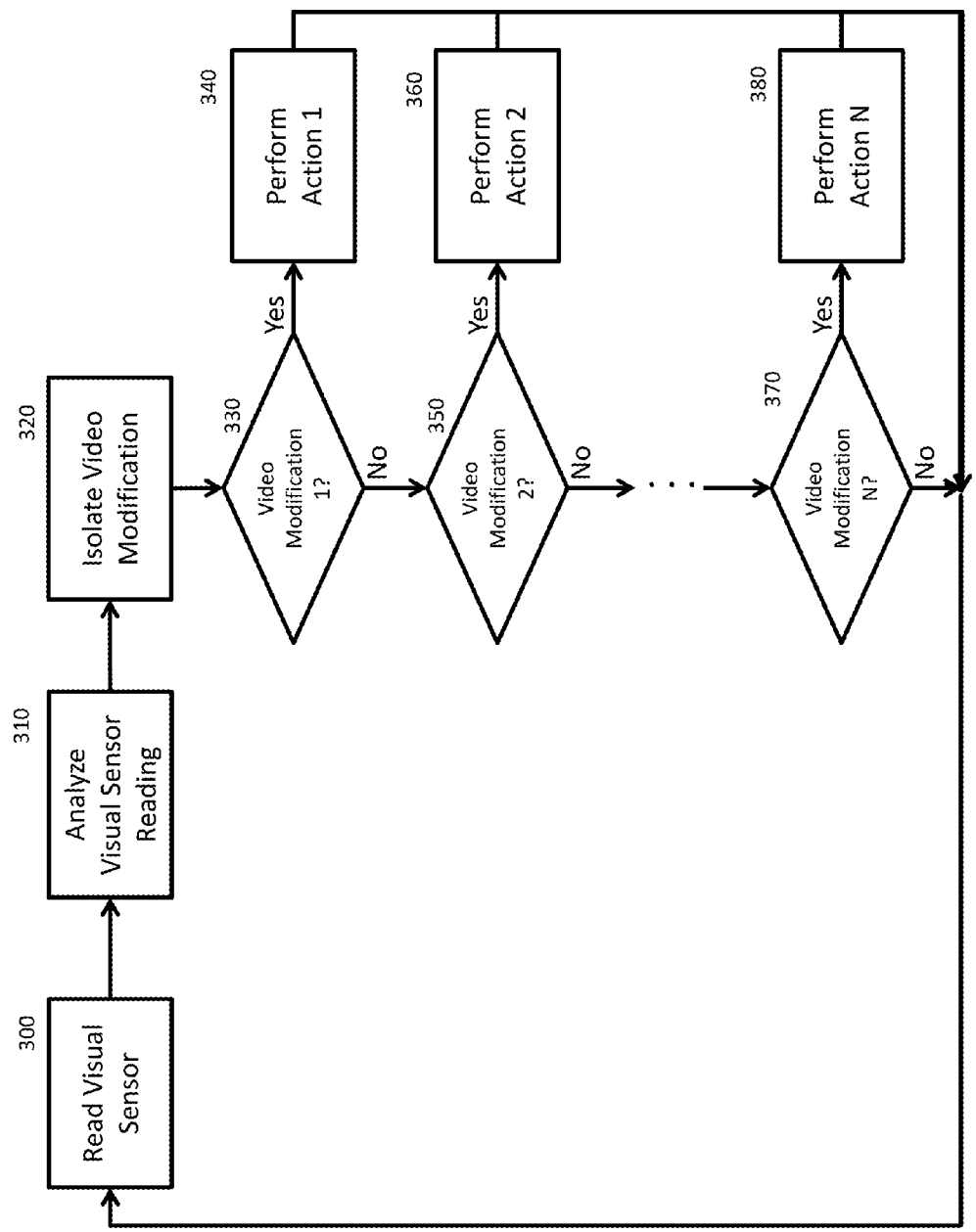
FIG. 5 provides a flow diagram illustrating another method of processing a video modification to remotely control a telepresence unit.

FIG. 5 provides a flow diagram illustrating another embodiment of the method of processing a video modification to remotely control a telepresence unit. In this embodiment, once the video modification is isolated 320 from a modified video, the video modification may be compared against a list of video modifications 330, 350, 370. The list of video modifications is pre-assigned with the action 340, 360, 380 to be performed by the telepresence unit. The list of video modifications may be included to the original video in sequence, so that the telepresence unit may perform a series of pre-assigned actions.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A telepresence unit comprising:
a base supported on driving means;
a mobile computing device communicating via an internet wherein the mobile computing device is placed on the base;
a drive mechanism providing a plurality of mechanical motions to the driving means;
a visual sensor placed to obtain a video modification generated from the mobile computing device; and
a control processor configured to communicate with the drive mechanism and the visual sensor wherein the control processor receives the video modification and outputs a signal to maneuver the drive mechanism, the control processor comprising a power unit.

2. The telepresence unit of claim 1, further comprising a second drive mechanism providing a plurality of mechanical motion to maneuver the mobile computing device, the second drive mechanism being attached to the mobile computing device, and the second drive mechanism being configured to communicate with the control processor.

3. The telepresence unit of claim 1 wherein the video modification is represented by a color block.

4. The telepresence unit of claim 1 wherein the video modification is represented by a matrix barcode.

5. The telepresence unit of claim 1 wherein the video modification is pre-assigned with the signal to maneuver the drive mechanism.

6. A telepresence system comprising:
a telepresence unit configured to be remotely maneuvered by a controller, the telepresence unit comprising a visual sensor and a mobile computing device, the visual sensor being configured to analyze a video modification displayed on the mobile computing device communicated by the controller;
a computer configured to communicate with the mobile computing device wherein the controller remotely maneuvers the telepresence unit by transmitting the video modification to the mobile computing device using the computer, the video modification being assigned a signal to maneuver the telepresence unit; and
a plurality of drive mechanisms configured to provide a plurality of mechanical motions to the telepresence unit in response to the video modification.

7. The telepresence system of claim 6 wherein the video modification is represented by a color block.

8. The telepresence system of claim 6 wherein the video modification is represented by a matrix barcode.

9. The telepresence system of claim 6 wherein the video modification is pre-assigned with a signal to maneuver the drive mechanism.

10. A method of remotely controlling a telepresence unit comprising a mobile computing device, using a computer, comprising the steps of:
establishing a visual communication channel between the mobile computing device and the computer;
receiving an original video generated from a video source;
modifying the original video to include a video modification;
transmitting the modified original video to the mobile computing device; and
configuring the telepresence unit to perform an action upon receiving the video modification.

11. The method of remotely controlling a telepresence unit of claim 10 wherein the step of establishing a visual communication channel with the mobile computing device comprises establishing a video conference connection with the mobile computing device.

12. The method of remotely controlling a telepresence unit of claim 10 wherein the video modification is represented by a color block.

13. The method of remotely controlling a telepresence unit of claim 10 wherein the video modification is represented by a matrix barcode.

14. A method of processing a video modification to control a telepresence unit having a visual sensor, comprising the steps of:
receiving the video modification displayed on the telepresence unit with the visual sensor;
analyzing the video modification using a control processor; and transmitting the analyzed video modification to a drive mechanism to maneuver the telepresence unit.

15. The method of processing a video modification to control a telepresence unit of claim 14 further comprising the step of:
   isolating the video modification displayed on the telepresence unit using a control processor, the control processor being configured to communicate with the visual sensor wherein the control processor receives the video modification and outputs a signal to maneuver the drive mechanism.

16. The method of processing a video modification to control a telepresence unit of claim 14 wherein the video modification is represented by a color block.

17. The method of processing a video modification to control a telepresence unit of claim 14 wherein the video modification is represented by a matrix barcode.

18. A telepresence unit comprising:
   a base supported on driving means;
   a mobile computing device communicating via an internet wherein the mobile computing device is placed on the base;
   a drive mechanism providing a plurality of mechanical motions to the driving means;
   a visual sensor placed to obtain a video modification generated from the mobile computing device, the video modification being represented as a color block;
   a control processor configured to communicate with the drive mechanism and the visual sensor wherein the control processor receives the video modification and outputs a signal to maneuver the drive mechanism, the control processor comprising a power unit; and
   a second drive mechanism providing a plurality of mechanical motion to maneuver the mobile computing device, the second drive mechanism being attached to the mobile computing device, and the second drive mechanism being configured to communicate with the control processor.

19. A telepresence system comprising:
   a telepresence unit configured to be remotely maneuvered by a controller, the telepresence unit comprising a visual sensor and a mobile computing device, the visual sensor being configured to analyze a video modification displayed on the mobile computing device communicated by the controller, the video modification being represented as a color block;
   a computer configured to communicate with the mobile computing device wherein the controller remotely maneuvers the telepresence unit by transmitting the video modification to the mobile computing device using the computer, the video modification being pre-assigned a signal to maneuver the telepresence unit; and
   a plurality of drive mechanisms configured to provide a plurality of mechanical motions to the telepresence unit in response to the video modification.

20. A method of remotely controlling a telepresence unit comprising a mobile computing device, using a computer, comprising the steps of:
   Establishing a video conference connection with the mobile computing device;
   receiving an original video generated from a video source;
   modifying the original video to include a color block;
   transmitting the modified original video to the mobile computing device; and
   configuring the telepresence unit to perform an action upon receiving the color block.

* * * * *